May 10, 1966  M. TRUPP  3,250,495
COMPOUND PHOTONIC JET PROPULSION
Filed June 3, 1964  2 Sheets-Sheet 1
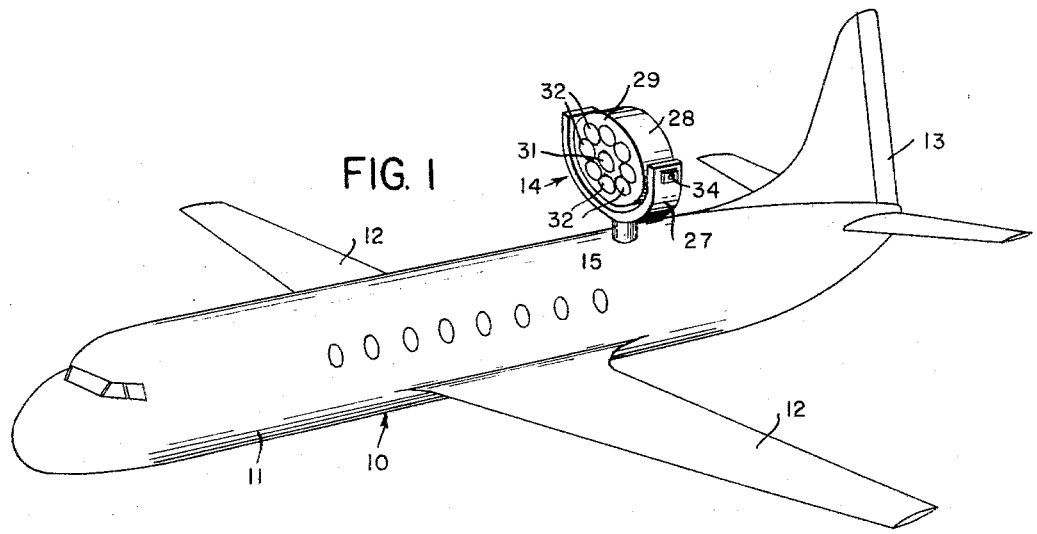
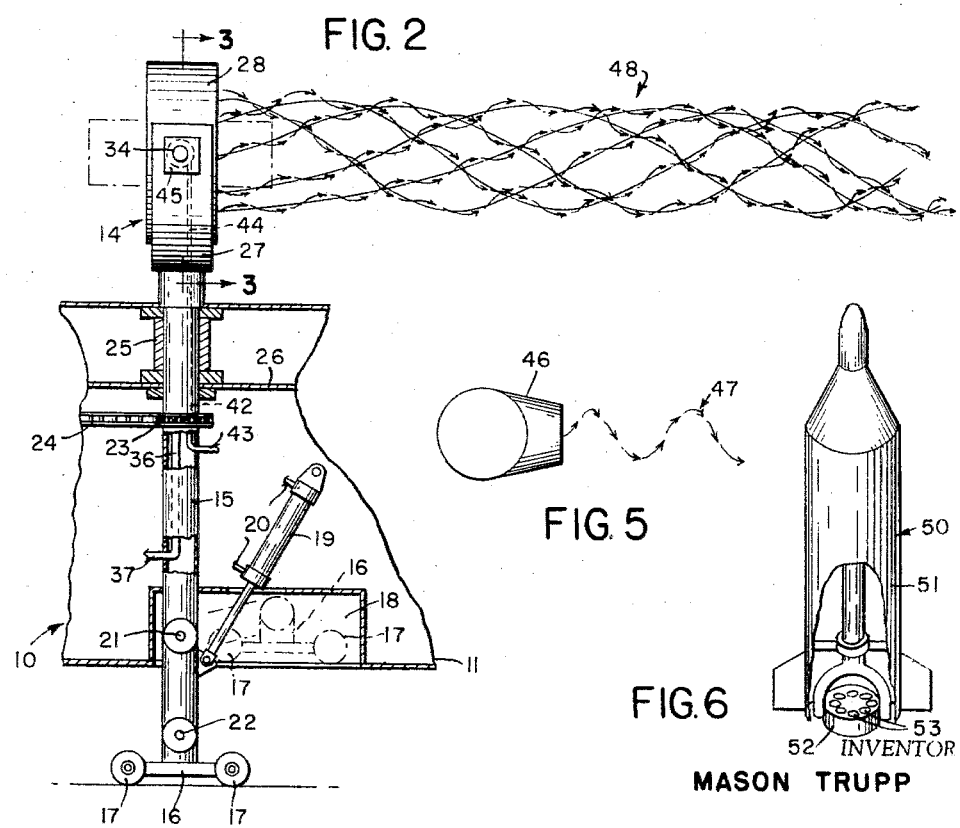
INVENTOR
MASON TRUPP
BY
ATTORNEY

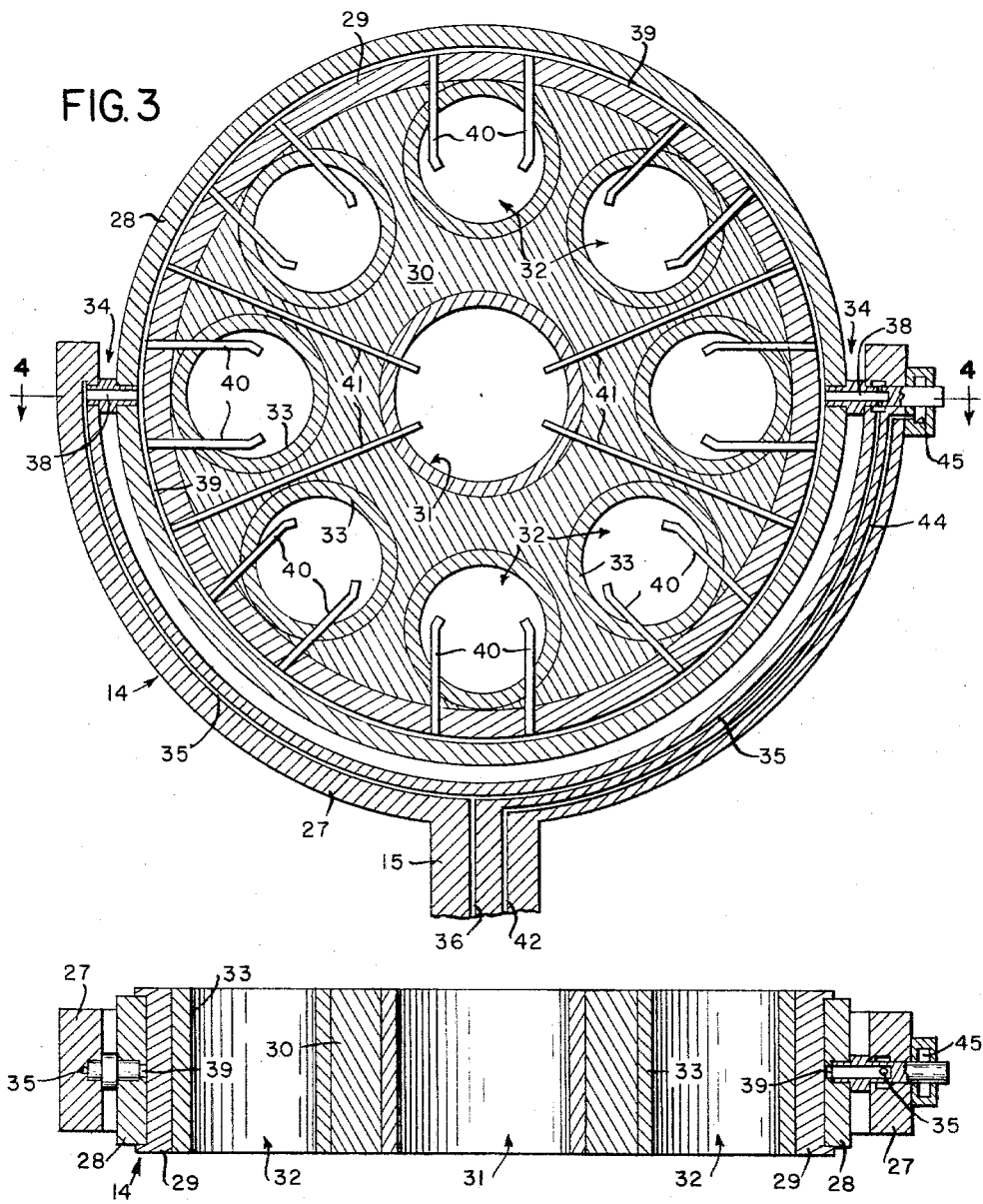

3,250,495
COMPOUND PHOTONIC JET PROPULSION
Mason Trupp, 310 Blanca Lane, Tampa 6, Fla.
Filed June 3, 1964, Ser. No. 372,178
9 Claims. (Cl. 244—54)

This invention relates to power units or engines, and more particularly to such power units for use on aircraft and the like.

The primary object of this invention is to provide a jet propulsion arrangement which includes a yoke that is mounted on a standard, and wherein the yoke has an annular housing pivotally connected thereto, and wherein the housing has a rotatable console with a plurality of jet engines mounted therein.

A further object is to provide a jet propulsion mechanism of the type stated which is adapted to produce a spiral wake which consists of a combined spiral thrust produced by the individual jet engines that are mounted in the console so that in effect there is provided an organized power console which acts as a single compound unit to insure and provide that certain important advantages will result as compared to existing or presently used fixed power structures.

Still another object is to provide such a compound photonic jet propulsion construction which is rugged in structure and efficient in operation and which is economical to manufacture and operate.

These and other objects of the invention will become apparent from a reading of the following specification and claims, together with the accompanying drawings, wherein like parts are referred to and indicated by like reference characters, and wherein:

FIG. 1 is a perspective view illustrating one application of the present invention and showing the compound photonic jet propulsion mounted on aircraft.

FIG. 2 is an enlarged vertical sectional view taken through the aircraft of FIG. 1 and illustrating schematically the compound wake or thrust that is produced by the plurality of individual engines.

FIG. 3 is an enlarged sectional view taken on the line 3—3 of FIG. 2.

FIG. 4 is a horizontal sectional view taken on the line 4—4 of FIG. 3.

FIG. 5 is a schematic view illustrating a simple wake produced by a single jet engine.

FIG. 6 is a view illustrating the present invention applied to a rocket or the like, and with parts broken away for clarity of illustration.

Referring in detail to the drawings, the numeral 10 indicates an aircraft or member which includes the usual fuselage 11, wings 12, and tail structure 13, and the numeral 14 indicates the compound photonic jet propulsion unit of the present invention.

As shown in FIG. 2, the unit 14 includes a generally vertically disposed standard 15 which extends through a portion of the fuselage 11, and a suitable landing gear mechanism is operatively connected to the lower end of the standard 15, and the landing gear mechanism 16 may include a plurality of wheels 17. In FIG. 2 the numeral 18 indicates a chamber or well which is adapted to selectively receive the landing gear mechanism 16 when the aircraft is in flight, and a hydraulic cylinder 19 may be provided for extending or retracting the landing gear 16, and the hydraulic cylinder 19 is adapted to be connected to a suitable source of hydraulic fluid under pressure by means of conduits or lines 20. The numerals 21 and 22 indicate joints or knuckle arrangements which permit the landing gear 16 to be extended or retracted as desired or required.

The standard 15 is rotatably mounted in the fuselage 11 so that the standard 15 can rotate about a generally vertical axis, and in order to rotate or turn the standard 15, a suitable mechanism can be provided such as a sprocket 23 which is adapted to be mounted on the standard 15, and a chain 24 is arranged in engagement with the sprocket 23, and the chain 24 may be operated from any suitable mechanism such as a motor which is under control of the pilot of the aircraft at a remote location such as the cockpit or control cabin of the aircraft. The numeral 25 indicates a bearing assembly which permits the standard 15 to rotate in the desired manner, and one or more struts or braces 26 may be provided for strengthening or reinforcing the bearing assembly and associated parts.

The numeral 27 indicates a semi-circular yoke which is fixedly mounted on or formed integral with the upper end of the standard 15, and the numeral 28 indicates an annular housing which is pivotally and swingably mounted in the yoke 27 at the points indicated by the numerals 34. A circular console 29 is rotatably arranged in the housing 28, and the console 29 may include an interior supporting structure 30 as well as a plurality of jet engines, and the jet engines may be arranged so as to include a centrally disposed jet engine 31 as well as a plurality of circumferentially spaced jet engines 32 which are arranged radially around the outer periphery of the console 29. The jet engines may be of any suitable construction and are adapted to include a generally cylindrical casing 33.

The yoke 27 is provided with a fuel passageway or channel 35 therein which has communicating therewith a fuel passageway 36, and the passageway 36 extends through the standard 15 and is adapted to be connected to a suitable source of supply of fuel by means of a line or conduit 37, FIG. 2. Suitable fittings 38 serve to establish communication between the passageway 35 and a passageway or duct 39 which is arranged adjacent the inner surface of the housing 28. There is further provided a plurality of spaced apart ducts or fittings 40 which are mounted in the console 29 and these fittings 40 serve to convey fuel from the passageway 39 to the operating portions of the jet engines 32, and there is also provided fittings 41 which are somewhat longer than the fittings 40 for permitting the jet fuel to be conveyed from the passage way 39 to the centrally disposed jet engine 31.

The numeral 42 indicates a passageway or conduit in the standard 15 which is adapted to be connected to a suitable source of hydraulic fluid under pressure by means of a line or conduit 43, and the passageway 42 communicates with a passageway 44 in the yoke 27, whereby this hydraulic fluid under pressure can be conveyed to a suitable mechanism 45 adjacent the upper end of the yoke 27, FIG. 3, and the mechanism 45 is adapted to be used for tilting or pivoting the housing 28 with the console 29 therein so that the housing and console can be pivoted about a generally horizontal axis which extends through the diametrically opposed pivot points 34.

Referring to FIG. 5 of the drawings, there is illustrated schematically a single jet engine 46 which produces a simple wake or thrust as indicated by the numeral 47. In contrast to the single jet engine produced wake 47 in FIG. 5, attention is directed to FIG. 2 wherein the numeral 48 indicates the compound wake or thrust which is produced from the plurality of jet engines used in the console of FIGS. 1 through 4, and the compound wake produces a spiral thrust which is highly advantageous over the simple wake produced by a single jet as later described in this application.

From the foregoing, it will be seen that there has been provided a compound photonic jet propulsion device, and in use with the parts arranged as shown in the drawings, it will be noted that a plurality of jet engines such as the engines 31 and 32 are adapted to be mounted in a cylindrical console such as the console 29. When a single jet engine 46 is used in a jet plane or the like, as shown in FIG. 5, this single jet engine 46 will produce a simple wake or thrust as the hot gases and air are discharged from the rear of the engine 46 and this single thrust has a tendency to spiral or resemble a whirlpool due to the inherent characteristics thereof. With the present invention a plurality of jet engines are mounted in a single console so that instead of producing the simple wake 47 as in FIG. 5, there is provided a compound spiralling wake 48 such as that shown in FIG. 2. In other words since a single jet engine will produce a spiral thrust, by arranging a plurality of the jet engines as shown in FIG. 3, there will be produced a cumulative or compound wake or thrust which results from all of the combined individual thrusts of the separate engines and the result will be a compound spiral wake 48 which has certain very important advantages over a simple wake 47 produced from a single engine.

As shown in the drawings, the console 29 which has the jet engines 31 and 32 mounted therein, is arranged so that the console 29 can rotate freely within the annular housing 28 so that the desired effect can take place. In order to insure that fuel is continuously supplied to the jet engines 31 and 32, there is provided the fittings or conduits 40 and 41 which are adapted to have their inner end portions communicate with conventional combustion chambers that form part of the jet engines, while the outer ends of the members 40 and 41 communicate with the channel 39 that has the fuel therein. The channel 39 is adapted to receive fuel through the fittings 38, and the fittings 38 receive fuel from the channel or passageway 35 which in turn receives fuel from the passageway 36 in the standard 15, and the passageway 36 is adapted to be connected to a suitable source of fuel such as fuel tanks in the aircraft or other member being propelled. Due to this arrangement, it will be seen that regardless of the rotated position of the console 29 in the housing 28, the fittings 40 and 41 will always be in communication with the channel 39 so that proper amount of fuel will be supplied to the jet engines as the console rotates.

In addition, the housing 28 which has the rotary console 29 therein, is pivotally or swingably supported in the yoke 27 by means of the pivot mountings 34 which may be of a suitable construction and a suitable hydraulic actuating mechanism 45 is adapted to be provided adjacent an end of the yoke 27 so that by properly operating controls which may be under the regulation or control of the pilot of the aircraft, hydraulic fluid can be pumped from a suitable source of supply through a conduit 43, then through a passageway 42 and then through the passageway 44 to the mechanism 45 whereby the entire housing 28 can be pivoted or moved about a horizontal axis so that the housing and console with the jet engines therein can be shifted or moved to different positions as desired or required.

Furthermore, a suitable mechanism is provided for rotating the standard 15 whereby the entire device 14 can be shifted about a vertical axis to the desired position and to accomplish this, a suitable mechanism such as the chain 24 and the sprocket 23 may be used. Thus, by causing movement of the chain 24, the standard 15 can be turned or rotated whereby the entire unit 14 can be moved to a desired angular position.

The parts can be made of any suitable material and in different shapes or sizes.

While the present invention has been illustrated for use on an airplane or aircraft, it is to be understood that the principles of the present invention are applicable to other types of members such as boats, trains, or other vehicles or the like. In other words, a unit such as the unit 14 may be mounted on a vehicle or member to be propelled or caused to move of any suitable type or configuration, and the present invention has been illustrated and described in connection with an airplane for purposes of illustration only.

In addition, the jet engines 31 and 32 may be of different types so that the present invention is not restricted or limited to any particular type of jet engine.

When the device is mounted on an aircraft, the landing gear 16 may be used as shown in FIG. 2, so that when the aircraft is in flight, the landing gear 16 may be conveniently retracted into the chamber 18 by means of a unit such as the unit or mechanism 19 which may be hydraulically operated.

It will be seen that according to the present invention that there has been provided a compound photonic propulsion device wherein energy is converted or produced in a spiralled direction for producing smoothly augmented thrust by means of spinning annular consoles having recoiling jet engines which can be adjusted for angular and mean free movement. The console can be placed above the fuselage in a forked standard or yoke which extends through the fuselage to support the landing gear such as the landing gear 16. Angular direction control in the rotating fork or standard provides for vertical take off and landing, braking, and permits spot anchoring aloft.

Some of the advantages of the present invention are as follows. There is provided organized power consoles which are such that the organized power console acts as a single compound unit to eliminate the stresses on the air frame that result from the present fixed distantly spaced power structures. Also, metal fatigue resulting from angular and reversing stresses caused by distantly spaced fixed units will be minimized or eliminated. The present invention will permit the use of new unexplored heavier metals and alloys can be reduced to a minimum, and for example aluminum may be used instead of being replaced by titanium and stainless steel as is presently contemplated. The present invention can be mounted on large transport planes with staged modification and elimination of existing power units and wing sections. The compound configuration of the power units augments torque, efficiency of the component units, and increases the life of each, and helps to reduce stalling, compression failures, and provides smoother transition of thrust, and the component units augment rather than compete for torque. The compound wake 48 insures that there will be flight by vortex which will yield greater energy conversion than accomplished by flight by wing lift. Also, air frame suppliers will benefit since transition from one jig design to another will be reduced to an engineering minimum.

As shown in FIG. 3, there is a single fuel supply in the grooved circumferential channel 39 to the console band 29, and this can be varied to accommodate larger land and amphibious supersonic transport aircraft and the like. The present invention can be operated by a single throttle control for multi-engined craft, and there is permitted direction and angular control of 360 degrees in all axes without craft roll. The principle of energy conversion can be applied to rockets, lunar landing modules, surface effect machines, monorail transportation, water and terrestial landings, and space technical laboratory craft and the like. Empennage failures are reduced to a minimum and may be compensated by angular thrust control of the compound photonic mechanism. The aircraft equipped with the present invention can hold its position as the spinning console of the recoiling engines revolves scanning the horizon, and spot anchoring of supersonic transports is provided for to allow for better traffic control. In addition, the present invention permits or allows for stage Doppler landings from anchored spot assignments from signalled horizon quadrants, and reduces stresses of sound barrier transition, and wing surfaces can be reduced to a minimum and the fuselage design may serve as the wing chord. Also, the present invention helps eliminate the need for mechanical extension of the wing surfaces which invite hydraulic failure or re-entry ablation, and permits abandonment of take off without danger of brake failure or nose over, and braking is reduced to a minimum and is only needed for parking the craft. Also, the present invention helps eliminate the effects of icing, wetness, slush and snow, and the engine wake 48 can be used to protect against icing. The engine wake and sound will be less annoying to ground personnel and waiting passengers, and there will be less need to cancel flights because of inclement weather, and improved precise scheduling of take off and landing is assured. Also, longer runways are not required, and experience take off and landing may be made at revetment assignments. There will be less danger to ground personnel, and the spinning console 29 yields unlimited power generation for electric and hydraulic requirements. Also there is less danger from engine blowouts, and the stress exigencies of control tower operation will be reduced. There will be greater protection for the craft and power units in the event of landing gear failure, collapse or tire blowout. Furthermore, flight control is transferred from the wing surfaces to the power unit and this permits for greater speeds and greater control. Also, peculiarities and sensitiveness of the lift will be reduced so that there will be reduced problems in frame or wing design, horizontal and vertical assemblies and their mechanical components. The forked standard including the yoke 27 is adapted to extend through the fuselage 11 and has the supporting landing gear 16 connected thereto which permits inflight refueling. Also, the present invention allows for additional support and stability at touchdown, and the compact design and safety features inherent in the design allows safer basis for nuclear power modification.

As shown in the drawings, the motors or jet engines do not extend beyond the console yoke. In FIG. 2 there is illustrated the compound organized wake 48 which is produced by the rotating compound photonic jet propulsion console. The line 43 is adapted to be used for supplying hydraulic fluid so that the console can be hydraulically controlled for rotation from a vertical to a horizontal position or vice versa so that the pitch can be controlled. By using the four point landing gear 16, vertical take off and landings will be more stable. The mechanism 45 which is part of the hydraulic system for pitch control can be of any suitable construction. In FIG. 5 the numeral 47 indicates a simple wake produced by a propeller type aircraft engine or present day jet engine, and as shown in FIG. 2 the numeral 48 indicates the organized and compounded wake produced by console rotation.

The console may be rotated to and from vertical or horizontal position by a suitable hydraulic system in conjunction with pinions and the like. The outer shell of the engine may be cooled by refrigeration if necessary. The console rotates within the yoke, but the engines are fixed in the console, and rotation occurs only as the console rotates. FIG. 3 illustrates the arrangement of the individual motors or engines in the console and shows the relation of the fuel vents or conduits in relation to the circumferential supply channel 39. Compartmentalization, front to rear in the yoke, provides such advantages as fire control, monitoring of each individual motor, and cooling thereof. The center of the console may remain unobstructed, or it may be additionally veined or turbined or provided with a fan turbine or jet engine as at 31, and this can be used to further compound the wake of the console. The gradient of energy between the large center engine 31 and the smaller peripherally located engines 32 may increase the torque and therefore the efficiency of the compound console.

In certain instances springs may be used to accommodate the thrust of the motors to reduce the effect during acceleration or deceleration although such springs can be omitted in certain instances and by omission of such springs, control of the console in all axes of direction will permit the cabin to remain in its normal attitude with its relation to the earth's plane of surface. When ascending, the console is adapted to be tilted and not the cabin and this applies for descent. As long as there is no angular acceleration of the cabin, the passengers should not feel the effects of acceleration as one would expect in a pitching and yawing high speed craft.

For stability, the landing gear may be an elongation of the standard 15 which supports the fork or yoke 27, and it can be used for supporting the console if it is necessary to remove the console from the craft for servicing and the like. A telescoping arrangement may be used to facilitate removal of the console and standard and reassembly to the landing gear below it, and it can make use of the available hydraulic system for retraction of the landing gear. The arrangement of the landing gear as illustrated is distinctly useful because of its location.

The engines are arranged as shown in FIG. 3 so that the wake of each engine will not spoil the wake of the other engines but actually will supplement the other wakes so that there is provided an organized compound spiral wake.

The present invention can be incorporated into hydrofoil and ship designs with variable control and angular attitudes of the foil chord for quicker energizing and directional control. The gyroscopic configuration of the parts as shown in FIG. 3 helps counteract turbulence along with the revolving console.

The console may have provision for permitting electrical connections to the various engines or motors.

All types of jet and rocket engines may be used in the present invention. When springs are used for the engines, the recoiling feature of each component engine supported by a spring placed on each side of the engine nacelle reduces the stresses produced by turbulent air.

An advantage of having the landing gear below the rotating standard and console is that in parking the craft, with the parts arranged as shown in the drawings, the craft will not be tail heavy so that the craft will not be tilted into an awkward angle to throw the passengers rearward as the craft comes to a stop. Also, the location of the landing gear immediately below the standard is a unique part of the present invention. The part of the standard extending below the fuselage can be retracted along with its wheeled gear within the frame of the fuselage during flight.

With the parts arranged as shown in the drawings, thrust efficiency is increased, and the reaction exhaust will be less annoying to passengers. Also, should such an aircraft need to land at sea because of some defect in the reaction engines, the craft can continue along at a reduced rate of speed but retaining the advantages of hydrofoil locomotion rather than by taxiing the hull in the sea and it would serve an additional advantage for take off in amphibious flight.

The organized compound wake 48 provides increased thrust as compared to conventional power plants.

By using the recoiling feature with the springs, there will be reduced stress produced by turbulent air. The standard which supports the compound photonic engine system may be incorporated into hydrofoil and ship designs with variable control in direction and angular attitudes of the foil chord for more efficient and quicker energizing and directional control for cruising, maneuvering, and berthing the craft. Also the present invention is applicable for supersonic and subsonic craft, and is adapted to be used in crafts which cruise or hover, as well as vertical take off type of craft and facilitates directional control through available axes. The present invention includes the forked standard with the gimbaled directional controls for support of the single, multiple and banked stationary and spinning console of propulsion and reaction engines, and the standard extends through the main body of the craft to the supporting landing gear. According to the present invention there is combined the individual spiral wakes to provide a compound organized wake which has a generally spiral direction to provide increased power and efficiency.

The landing wheels may be of the type which are detachable if desired. The console can be tilted to aid in taking off and landing. As shown in FIG. 1, the console is placed rearwardly of the main portion of the fuselage so that cabin noise will be minimized and this rearward arrangement also facilitates take off by proper use of thrust.

The present invention may be provided as original equipment on new aircraft and the like, or else existing aircraft can be modified to accommodate or receive such a console arrangement. The plurality of reaction engines or motors cause a vortex similar to a hurricane to accomplish the desired advantageous results. The natural torque of the motors or engines causes the console 29 to rotate, and thus there is a photonic type of motion and the wake has a generally spiral movement or formation. The arrangement of the console above the upper portion of the craft helps insure that personnel at the airport will not be inconvenienced or blown around by air blasts, and in addition the gimbaled arrangement permits use of the device as a heat source to melt ice on runways and the like whereas conventional engine mountings do not permit such use. In other words, the present invention will permit pivoting in both a horizontal or vertical direction. The present invention is not limited to any particular type of jet engine or motor and will accommodate or permit use of various types of motors such as turbo fans, turbo jets and the like, as well as nuclear energy types of engines. As previously described, even though the console is spinning, the fuel will still be properly supplied thereto. Various conventional accessories may be used as needed or required, and a suitable mechanism can be used for initially starting the engines. With the present invention the vortex effect is created which is such that the desired results will be accomplished.

The present invention is directed to a process or method as well as the apparatus for accomplishing the aforementioned objectives, and the present invention is applicable to various types of devices such as rockets, missiles and the like together with members which operate in silos or other installations. The present invention is also adapted to increase the efficiency of the lift off. Also a suitable brake mechanism can be used in conjunction with the present invention and if necessary this may be released for cruising to orbital flight. In addition, suitable means may be used in conjunction with the present invention to maintain secrecy precautions if desired or required.

In connection with the exigency of forced landing at sea, these necessarily expensive craft would not run the risk of inundation and immersion of the power units by sea water since the craft hull is water tight. Extensible and retractible hydrofoils would allow take off after engine repairs or re-fueling was accomplished. In all current aircraft whose engines are wing, empennage or fuselage attached, inundation occurs almost immediately in case of landing at sea. In the craft of the present invention, re-fueling or repairs could be made from ships at sea without loss of the craft.

In applying the present invention to missiles, it may be advisable to note that instead of turbine engines being nacelled into the console, it would be necessary only to introduce the venturi nozzles into the console; the standard, the semi-circular yoke, the circular housing and a console type of whirling plurality of nozzles to conduct rocket exhaust would be substituted for the turbine.

In missiles and rocketry, the standard would be uppermost to receive fuel and the gimbaled engine inverted to the direction of the launch pad.

The present invention is directed both to the procedure or method and means for rotating the console, and the present invention is adapted to be used in the design and construction of missiles and the like.

Instead of a missile with fixed nozzles, a banked console of engines could be rotated by use of the standard which supports the yoke and conducts fuel from storage tanks to the venturi nozzles for development of a compound wake. In the missile the yoke may not be necessary but the standard could conduct the fuel directly to each nozzle by branching tubes which emerge from the single standard which can rotate in the central long axis of the missile. The yoke however would allow for directional control by the astronaut and would be advantageous for both remote and direct control.

If desired or required, a bolt or lock may be placed on the console from the yoke to the console so that it could be released for console rotation in flight if it was desired that secrecy of its rotation be maintained for defense reasons.

With further reference to the present invention, it is to be noted that the jet fuel in its location would help to float the console within its yoke much the same as a liquid bearing arrangement.

As a variation, the present invention encompasses a central standard supplying the engines from the center of the console rather than or in addition to supply from the periphery of the yoke.

The present invention may also be used with reaction type or ion exchange types of engines or motors.

Attention is directed to FIG. 6 of the drawings wherein there is illustrated the present invention used in a rocket or the like wherein the numeral 50 indicates a rocket or similar member which may include an outer shell or housing 51 as well as a console 52 which may be rotatably arranged in the rocket, and a plurality of motors 53 are mounted in the console 52, and the rocket 50 in FIG. 6 is adapted to operate on or with a compound photonic propulsion unit in a manner similar to that previously described.

The console whirls to produce an organized spiral thrust. Analysis of the thrust from a single jet engine reveals it to be made up of segments of spirals, and in the present invention there is utilized the unique idea of spinning the console. The craft in fact is adapted to be a jet propelled and energized flying craft which acquires the stability of the gyroscope as far as angular stability, orientataion and capability of sustaining the dangers of turbulent air masses through which aircraft must travel at both high and low altitudes. Also, it is to be noted that with the present invention there is an augmentation of the energy waves coming from the spinning console and this is unique. Also the manifolding of the multiple engines for lift and guidance in a convenient system eliminates the disadvantages of distantly fixed engines and provides other advantages not available in other crafts and engine systems. Also in the present invention centrifugal, curvilinear and angular gravity accelerations are insulated from preferred straight line or tangential gravity accelerations.

The previously used word photonic does not refer to compressors, combustion chambers and turbines, but photonic refers to the specific type of energy wave or wakeform emanating from the spin of the multi-chambered console propulsion unit which is entirely different from prior propulsion systems. The spin of the console is due to natural reaction to the torque developed within the housing. In the centrally fueled unit, the console is retained by the standard, while in the peripherally fueled unit, the console is retained within its housing in the same manner that a turbine is retained in its housing and because the housing extends the length of the propulsion unit, various methods including roller bearing retention means and the like can be used to prevent it from sequestering.

Minor changes in shape, size and rearrangement of de-

What is claimed is:

1. A compound photonic jet propulsion unit comprising a standard, a yoke affixed to the upper end of said standard, a circular housing pivotally connected to said yoke, an annnular console rotatably arranged in said housing, and a plurality of engines mounted in said console.

2. In a compound photonic jet propulsion device, a generally vertically disposed standard, a semi-circular yoke affixed to said standard, a circular housing pivotally connected to said yoke, an annular console rotatably arranged in said housing, and a plurality of jet engines mounted in said console, and whereby there is produced a compound organized spiral wake from the plurality of engines in the rotating console.

3. The structure as defined in claim 2 and further including means for supplying fuel through the standard, yoke, housing, and console to the engines.

4. The structure as defined in claim 2 and further including means for rotating said standard and pivoting said housing in said yoke.

5. The structure as defined in claim 2 and further including a landing gear mechanism operatively connected to the lower end of said standard.

6. The structure as defined in claim 2 wherein said engines are arranged in radially disposed formation around the circumference of the console.

7. In a compound photonic jet propulsion device, a generally vertically disposed standard, a semi-circular yoke affixed to said standard, a circular housing pivotally connected to said yoke, an annular console rotataby arranged in said housing, and a plurality of jet engines mounted in said console, and whereby there is produced a compound organized spiral wake from the plurality of engines in the rotating console, means for supplying fuel through the standard, yoke, housing and console to the engines, means for rotating said standard and pivoting said housing in said yoke, a landing gear mechanism operatively connected to said standard, said engines being arranged in radially disposed formation around the circumference of the console, and wherein there is produced a compound spiral vortex photonic wake from the plurality of engines in the rotating console.

8. In a device of the character described, an aircraft including a fuselage, wings and tail structure, a compound photonic jet propulsion unit including a standard extending through said fuselage, a landing gear mechanism operatively connected to the lower end of said standard, a chamber for selectively receiving said landing gear mechanism, means for rotating said standard about a vertical axis, a semi-circular yoke fixedly secured to the upper end of said standard, an annular housing pivotally and swingably mounted in said yoke, a circular console rotatably mounted in said housing and said console embodying a supporting structure, there being a plurality of jet engines mounted in said console, said jet engines including a centrally disposed engine and a plurality of circumferentially spaced engines arranged radially around the outer periphery of said console, there being a fuel channel in the inner surface of said housing, a plurality of fittings mounted in said console and said fittings establishing communication between said engines and said fuel channel, passageways in said yoke and standard for conveying fuel from a source of supply into said channel, a hydraulic mechanism for selectively tilting the housing in the yoke, and wherein there is provided a compound wake from the plurality of engines which are mounted in the console to form a spiralling vortex organized thrust and wake.

9. In a compound photonic propulsion unit, a yoke, a housing pivotally connected to said yoke, a console rotatably arranged in said housing, and a plurality of motors mounted in said console.

References Cited by the Examiner

UNITED STATES PATENTS

| | | | |
|---|---|---|---|
| 2,119,369 | 5/1938 | Twining | 244—56 |
| 2,515,644 | 7/1950 | Goddard | 244—74 X |
| 2,926,868 | 3/1960 | Taylor | 244—56 X |
| 2,926,869 | 3/1960 | Sullivan | 244—52 |
| 2,973,921 | 3/1961 | Price | 244—74 X |

FOREIGN PATENTS 24,116  12/1929  Australia.

MILTON BUCHLER, *Primary Examiner.*

FERGUS S. MIDDLETON, *Examiner.*

L. C. HALL, *Assistant Examiner.*